Oct. 27, 1936.  G. F. DRAKE  2,058,426
THERMOSTAT
Filed Jan. 3, 1933
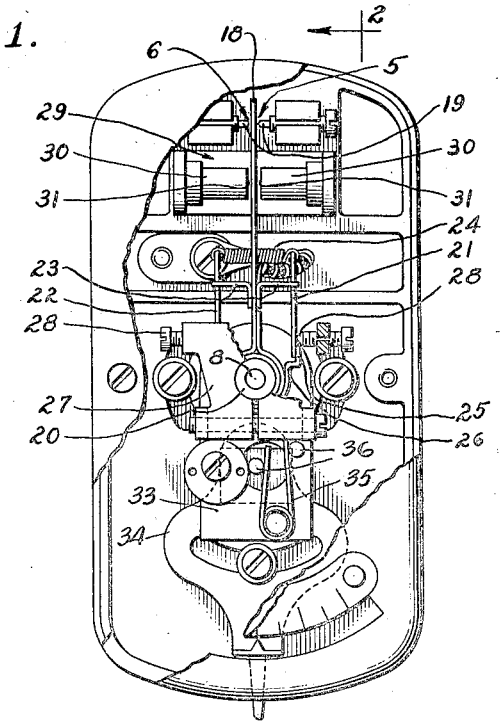
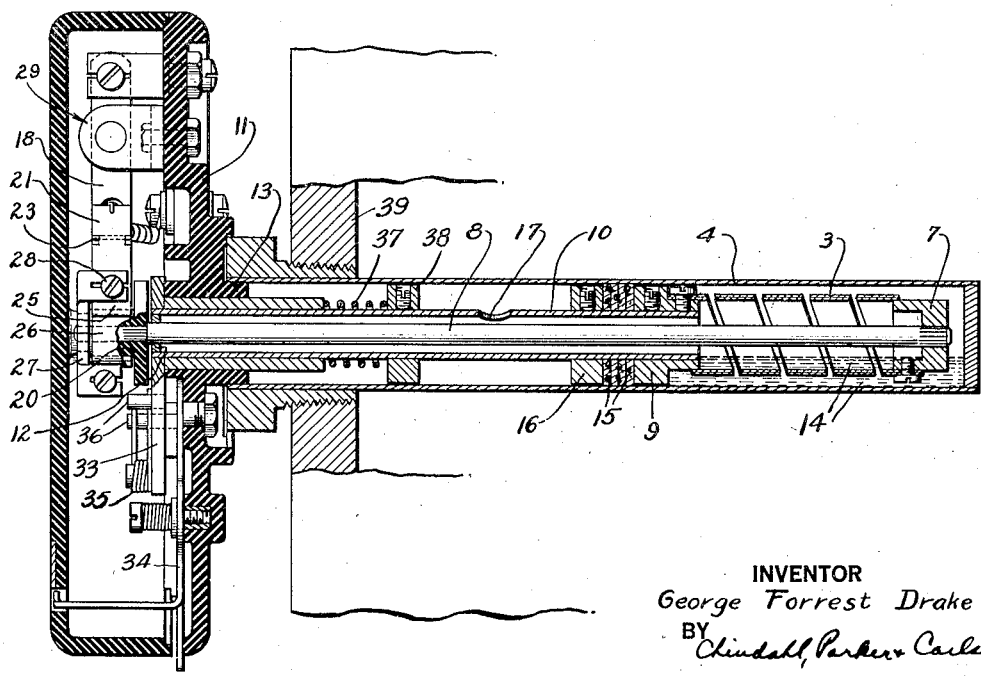
INVENTOR
George Forrest Drake
BY
ATTORNEYS Patented Oct. 27, 1936

2,058,426

UNITED STATES PATENT OFFICE 2,058,426

THERMOSTAT

George Forrest Drake, Rockford, Ill., assignor to Howard D. Colman, Rockford, Ill.

Application January 3, 1933, Serial No. 649,897

12 Claims. (Cl. 200—139)

This invention relates to improvements in thermostats and more particularly to those of the so-called immersion type in which the thermo-sensitive element is enclosed by a protecting casing immersed in the fluid the temperature of which controls the thermostat.

As heretofore constructed, thermostats of the above character have been characterized by an objectionable lag in following the temperature of the controlling fluid. An important object of the present invention is to overcome this objection by providing for the rapid transfer of heat between the thermostatic element and the protecting casing without at the same time introducing friction or other resistance interfering with freedom of movement of the element.

In carrying out the foregoing object, the invention contemplates the introduction into the protecting case of a body of liquid which remains fluid at the working temperature of the thermostat and which provides a connection adapted to conduct heat rapidly between the casing and the thermostatic element.

The invention also resides in using as the heat-conducting connection above referred to, a liquid such as mercury which has a high boiling point, low vapor pressure, high thermal conductivity and low thermal capacity.

A further object is to provide a novel means for sealing the mercury in the protecting casing of the thermostat.

An immersion thermostat is frequently subjected to temperatures varying widely from the temperature at which the thermostat is set to respond with the result that the thermostatic element becomes strained to an objectionable degree and frequently damaged. It is also an object of the present invention to overcome this difficulty by employing a motion-transmitting connection of novel construction adapted to maintain any desired setting of the thermostat but adapted to yield without destroying such setting under any abnormal temperatures and prevent damage to the thermostat element.

Another object is to provide, in a thermostat having a detent device for obtaining a rapid movement of the controlling arm between two limit positions, a novel means by which the temperature differential to which the thermostat responds may be varied as desired without affecting the operation of the detent device.

Other objects and advantages of the invention will become apparent from the following detailed description taken in connection with the accompanying drawing, in which, Figure 1 is a front elevational view of a thermostat embodying the features of the present invention, a portion of the cover being broken away.

Fig. 2 is a sectional view taken along the line 2—2 of Fig. 1.

In the form selected for purposes of illustration, the invention is embodied in an immersion thermostat in which a thermo-sensitive element 3 disposed within an imperforate protecting casing in the form of a metallic tube 4 actuates a control instrumentality such as switches 5 and 6 in response to temperature changes of the fluid to which the tube is exposed. As is generally the case in thermostats of this kind, the element 3 comprises an elongated strip of bi-metallic material coiled into the form of a helix of a diameter slightly less than the tube and having the end adjacent the closed end of the tube fastened to a head 7 on an elongated rod 8 and the other end secured to a head 9 on the end of a sleeve 10 of smaller diameter than the coil 3. The head 9 serves to support the inner end of the sleeve concentric with the tube and also acts through the medium of the element 3 to maintain concentric relation of the sleeve and rod. The element 3 is thus free to expand and contract under temperature changes.

The end of the sleeve opposite the element 3 projects beyond the open end of the tube 4 through an elongated insulating base 11 in which the sleeve is snugly received. The corresponding end of the rod 8 projects from the sleeve and is centered therein by a bushing 12 closing the end of the sleeve while permitting freedom of relative rotation between the sleeve and rod. Formed on the base 11 is a flange 13 which fits snugly into the open end of the tube 4 as the base with the sleeve and rod mounted thereon are inserted in the tube.

To provide for adjustment of the thermostat, an arm 33 is fast on the outer end of the sleeve 10 and held in fixed position relative to an adjusting lever 34 by a spring 35 acting between pins 36 projecting from the arm and lever. By shifting the lever laterally, the angular position of the sleeve 10 within the base 11 may be changed as desired. A spring 37, acting between a collar 38 and a sleeve 39 in which the sleeve 10 is journaled serves to maintain proper axial relation of the parts while permitting removal of the base 11 and the parts carried thereby from the tube 4.

The present invention contemplates the use of a quantity 14 of liquid heat-conducting medium within the tube 4 immersing at least a part of the thermostatic element 3 so as to form a connection between the element and the tube capable of conducting heat between the two rapidly without introducing friction or otherwise decreasing the sensitivity of the thermostat. Preferably, the level of the liquid is below the sleeve 10 when the latter is disposed in horizontal position. Mercury is ideally suited for this purpose, first because it remains liquid over the range of temperatures for which immersion thermostats are ordinarily used, and secondly because its low vapor pressure avoids any substantial loss by evaporation in service use. Because of its metallic character, mercury possesses high thermal conductivity and low heat capacity both of which render the thermostat extremely sensitive. A thermostat constructed in accordance with the present invention will follow temperature changes in a water bath nearly as rapidly as when the thermostatic element is immersed directly in the bath.

The use of mercury as the heat conducting medium necessitates making all of the parts with which it contacts of material such as iron and ferrous alloys with which mercury does not form an amalgam. Provision is also made for sealing the tube 4 against the escape of the mercury. Herein this may be accomplished by a plug consisting of washers 15 composed of yieldable material such as cork fitting snugly around the sleeve and in the tube and retained between the head 9 and a clamping collar 16. The plug thus formed will slide readily in the tube and will effectually prevent escape of the mercury along the inner wall of the tube.

To facilitate assembly of the thermostat, it is preferred to introduce the mercury after mounting of the sleeve 10 and the rod 8 upon the base 11. For this purpose, an aperture 17 through which the mercury may be poured is formed in the sleeve preferably in the upper portion thereof between the plug 15 and the base 11. In assembly of the thermostat, the tube 4 is first screwed into the wall on which it is to be mounted and the thermostatic element and sleeve assembly inserted in the open end of the tube until the plug 15 enters such end, the hole 17 being disposed outside of the tube and at the top of the sleeve. A quantity of mercury sufficient to cover the lower portion of the element 3 is then poured through the hole and allowed to flow down the sleeve 10 beyond the end thereof. The bushing 12 prevents flowing of the mercury out of the other end of the sleeve during the filling operation. Then the sleeve is pushed farther into the tube, the flange 13 finally becoming seated in the tube with the base 11 in upright position. The mercury is thus trapped in the tube beyond the plug 15 and remains in this space so long as the position of the thermostat is not disturbed.

The control instrumentality which, as above set forth, herein takes the form of switches 5 and 6, is actuated by a motion-transmitting connection extending through the open end of the protecting casing 4. This connection includes the rod 8 and an elongated substantially straight tongue 18 preferably composed of magnetic material and extending along the base 11 with its upper free end disposed between two stationary opposed contact stops 19 with which the tongue cooperates to form the switches.

The present invention contemplates a construction of the motion-transmitting connection in a manner such as to permit of a substantial yielding of the connection upon continued expansion or contraction of the thermostatic coil 3 after the tongue has engaged one or the other of the contacts 19, and this, without destroying the setting of the thermostat for response to temperature changes relative to a predetermined value. To this end, the tongue is supported at its lower end by and loosely pivoted on a bushing 20 fast on the forwardly projecting end of the rod 8. Mounted on the tongue to swing laterally about axes extending parallel to the tongue axis are two levers in the form of bars 21 and 22 fulcrumed intermediate their ends on the ends of lugs 23 rigid with and projecting laterally from the tongue intermediate the ends of the latter. At their upper ends, the bars 21 and 22 are joined by a contractile spring 24 which normally tends to swing the bars against opposed stops 25 formed by a strap 26 rigid with the hub of the tongue. The tongue and the levers supported thereon when in engagement with the stops 25 thus constitute a unit which is swingable about the tongue axis.

Angular movements of the rod 8 are imparted to the unit above referred to through the medium of oppositely acting one-way connections with the levers 21 and 22. To form these connections, an arm 27 clamped on and thereby made fast to the outer end of the bushing 20 carries two stops 28 which are disposed externally of the bars 21 and 22 for engagement with these bars adjacent the stops 25. The stops 28 are formed by screws threading into the arm 27 so that the degree of lost-motion between the arm and the tongue unit may be varied as desired.

If the stops 28 are spaced the same distance apart as the stops 25, there will be no lost motion in the motion-transmitting connection, and the levers 21 and 22 will each engage their stops 25 and 28 when the existing temperature tends to maintain the tongue between the contacts 19. If now a wide variation in temperature occurs swinging the arm 27 clockwise, the arm acting on the lever 22 will move the tongue and lever as a unit in the same direction until the switch 5 is closed, the lever 22 being maintained against its stop 25 owing to the fact that the resiliency of the spring 24 is then slightly greater than that of the thermostatic coil. Then as the temperature change increases and the stress developed in the coil 3 is sufficient to overcome the spring 24, the arm 27 continues to move while the tongue remains stationary. This movement is permitted by swinging of the lever 22 about its fulcrum which may, owing to the permissible movement of the lever 22, continue over a wide range of temperature change. Then as the arm 27 moves reversely, the lever 22 is allowed to swing back toward its stop 25, the tongue maintaining the switch 5 closed until the stop is engaged by the lever and the tension in the thermostatic element decreased below that of the spring 24.

The same action as above described takes place upon a wide temperature change causing counter-clockwise movement of the arm 27, yielding of the connection resulting in swinging of the lever 21 relative to the arm. The construction thus permits, without destroying the setting of the thermostat, yielding of the motion-transmitting connection through a relatively wide variation in temperature either above or below that for which the thermostat is set to respond.

Another advantage of the present yieldable connection is that it permits the use of a magnetic detent or over-center device 29 for avoiding chattering of the thermostat tongue while at the same time permitting the range of temperature change required for opening one switch and closing the other to be increased as may be desired. The device 29 comprises a magnet having two poles 30 with faces 31 of equal area disposed on opposite sides of the tongue 18, the upper end portion of which constitutes the magnet armature. The faces 31 are spaced apart a greater distance than the contacts 19. With this arrangement, an attractive force will be exerted on the tongue according to the location of the tongue relative to the center of the gap between the pole faces so that the tongue will remain against one of the contacts 19 until the attractive force maintaining this position is overcome whereupon the tongue will be moved with a quick snap action against the other contact.

It is often necessary in practice to render a thermostat of the present character responsive only to a relatively wide temperature differential which is generally accomplished by increasing the spacing of the contacts 19. Such a change would prevent proper operation of the magnetic detent but is rendered possible by adjustment of the yieldable connection above described. To thus increase the desired temperature differential, the screws 28 are backed away from the levers 21 and 22 to provide lost-motion in the motion-transmitting connection permitting some degree of movement of the arm 27 independently of the tongue and lever unit. In this way, response of the thermostat to any desired temperature differential may be obtained without in any way affecting the operation of the magnetic detent.

I claim as my invention:

1. An immersion thermostat combining an elongated tube closed at one end, a sleeve projecting into said tube, a rod extending through said sleeve beyond the inner end of the latter, an elongated strip of bimetallic metal within said tube spirally coiled around the inner end of said rod and having opposite ends secured to the sleeve and rod respectively, a plug surrounding and secured to said sleeve adjacent said strip and adapted to be received in said tube snugly upon insertion of the rod and sleeve, and a hole in said sleeve disposed between said plug and the outer end of the sleeve so as to be located outside of said tube upon insertion of the sleeve until said plug enters the open end of the tube, said sleeve serving upon the pouring of liquid into said hole to conduct such liquid into the space between said plug and the closed end of the tube.

2. An immersion thermostat combining an elongated tube closed at one end, a sleeve projecting into said tube, a rod extending through said sleeve beyond the inner end of the latter, an elongated strip of bimetallic metal within said tube spirally coiled around the inner end of said rod and having opposite ends secured to the sleeve and rod respectively, a plug surrounding and secured to said sleeve adjacent said strip and adapted to be received in said tube snugly upon insertion of the rod and sleeve, a hole in said sleeve disposed between said plug and the outer end of the sleeve so as to be located outside of said tube and at the top of the latter upon partial insertion of said sleeve with the tube disposed horizontally and said sleeve and tube in a predetermined angular relation, said sleeve serving, upon the pouring of liquid through said hole, to conduct the liquid into the space between the plug and the closed end of said tube, and means acting to prevent the flow of said liquid through said sleeve in the opposite direction while permitting freedom of relative movement between said sleeve and rod.

3. A thermostat combining a control member mounted for movement in opposite directions between two limit positions, opposed stops determining said positions, two independently operable levers fulcrumed on said member, spring means normally acting to swing said levers in opposite directions relative to said member, means for limiting such movements of the levers, a thermostatically actuated element movable in opposite directions in response to rises and falls in temperature relative to a predetermined value, and oppositely acting one-way connections between said element and the respective levers, each operable upon movement of said element in one direction to move one of said levers and said member as a unit until one of said stops is engaged by the member and then to move the lever relative to the member against the action of said spring means.

4. A thermostat combining a control member mounted for movement in opposite directions between two limit positions, opposed stops determining said positions, two independently operable levers fulcrumed on said member, spring means normally acting to swing said levers in opposite directions relative to said member, means for limiting such movements of the levers, a thermostatically actuated element movable in opposite directions in response to rises and falls in temperature relative to a predetermined value, oppositely acting one-way connections between said element and the respective levers, each operable upon movement of said element in one direction to move one of said levers and said member as a unit until one of said stops is engaged by the member and then to move the lever relative to the member against the action of said spring means, said member providing a flat magnetic armature adjacent said stops, and a magnet providing two oppositely facing closely spaced magnetic poles on opposite sides of said armature, each of said connections being adjustable to vary the amount of lost motion between said element and said levers whereby to change the degree of sensitivity of the thermostat without affecting the action of said magnet upon said armature.

5. A thermostat combining a pair of closely spaced stops, a control member movable in opposite directions into engagement with the respective stops and having opposed stops rigid therewith, two independently operable levers fulcrumed on said member, means on said member limiting the movements of said levers in opposite directions, spring means normally urging the respective levers into engagement with said limiting means, a thermostatic element, an actuating member arranged to be moved in opposite directions by said element and having one-way connections with the respective levers, each of said connections operating upon movement of the actuating member in one direction to move said control member and one lever as a unit into engagement with one of said stops and then to move such lever relative to the control member.

6. A thermostat combining a stop, an elongated arm mounted to swing about a fixed axis toward and away from said stop, a lever extending longitudinally of and pivoted on said arm to swing about an axis located intermediate the ends of the arms and extending substantially parallel to said first mentioned axis, spring means acting on said lever to swing the latter in one direction relative to said arm, means on said arm limiting the movement of the lever by said spring means, a thermostatic element, a member actuated by said element and engaging said lever whereby, upon movement in one direction, to swing said lever and arm as a unit about said fixed axis until said stop is engaged by the arm and then to move said lever relative to the arm and away from said limiting means.

7. A thermostat combining a stop, an elongated arm mounted to swing about a fixed axis toward and away from said stop, a lever pivoted on said arm to swing about an axis spaced a substantial distance from and extending substantially parallel to said first mentioned axis, spring means acting on said lever to swing the latter in one direction relative to said arm, means on said arm limiting the movement of the lever by said spring means, a thermostatic element, a member actuated by said element and engaging said lever whereby, upon movement in one direction, to swing said lever and arm as a unit about said fixed axis until said stop is engaged by the arm and then to move said lever relative to the arm and away from said limiting means.

8. A thermostat combining a stop, an elongated arm mounted to swing about a fixed axis toward and away from said stop, a lever pivoted on said arm to swing about an axis spaced a substantial distance from and extending substantially parallel to said first mentioned axis, spring means acting on said lever to swing the latter in one direction relative to said arm, means on said arm limiting the movement of the lever by said spring means, a thermostatic element, a member actuated by said element and having an adjustable one-way connection with said lever operable upon movement of the member in one direction to swing said arm and lever as a unit until said stop is engaged and then to move the lever relative to the arm.

9. A thermostat combining a fixed contact, a contact arm movable into and out of contacting engagement therewith, a stop on said arm, a lever fulcrumed on said arm and resiliently urged about its fulcrum toward said stop, a thermostatic element, an actuating member movable in opposite directions by said element and operable upon continued movement in one direction to move said arm through the medium of said lever until the arm engages said contact and then to move the lever away from said stop, said member, upon reverse movement, permitting movement of the lever against said stop before retraction of said arm away from said contact.

10. A control instrument comprising, in combination, a pair of closely spaced stationary stops, a movable contact disposed between said stops and cooperating with one of the stops to form a control switch, an operating shaft, a sensitive actuating element for said shaft having a normal range of operation determined by the spacing of said stops, and a motion-transmitting device between said shaft and said movable contact, said device including a part carrying said movable contact and loosely supported by said shaft, another part movable by said actuating element and extending substantially parallel to the first part in laterally offset relation to the axis of said shaft, and spring means acting to hold said parts in a normal predetermined relation for movement in unison while said movable contact moves between said stops but permitting relative movement between the parts in opposite directions from said normal relation upon movement of the actuating element beyond its said normal range of operation in opposite directions.

11. A control instrument comprising, in combination, an operating shaft, a thermostatic actuating element having one end normally held stationary and the other end connected to said shaft to actuate the same, an arm mounted to turn on said shaft and carrying a movable contact, a pair of stops acting to limit the movement thereof and one cooperating with said contact to form an electric switch, and a device for transmitting motion from said shaft to said arm including a second arm fixed on the shaft and having a part offset laterally from the first arm and from the axis of the shaft, and spring means acting to hold said two arms in a normal predetermined relation for movement in unison while said movable contact is moved between said stops, but permitting relative movement between the two arms in opposite directions from said normal position upon movement of the actuating element beyond the normal range of operation in either direction determined by the spacing of said stops.

12. An insertion thermostat comprising a controlling switch mechanism having a housing, an operating shaft projecting from the housing, and a helically coiled thermostatic actuating element encircling the end of the shaft opposite said housing, said actuating element being of a length substantially less than the length of said shaft and having one end secured to the projecting end of the shaft and its other end connected with said housing so as to be held against movement, a tubular metallic casing having an open end removably secured to said housing and an opposite closed end whereby to enclose completely said shaft and actuating element with the latter spaced from the inner peripheral wall of the casing, said casing providing when disposed horizontally a trough-like receptacle of a length corresponding approximately to the length of said actuating element and adapted to contain a heat conducting element in liquid form in a quantity sufficient to fill the space between the actuating element and the casing, and means adapted when said actuating element is partially inserted into said casing to conduct said liquid into said trough-like receptacle.

GEORGE FORREST DRAKE.